United States Patent

[11] 3,633,696

[72] Inventor William K. Kleysteuber
McCandless Twp., Allegheny Cty., Pa.
[21] Appl. No. 80,863
[22] Filed Oct. 15, 1970
[45] Patented Jan. 11, 1972
[73] Assignee United States Steel Corporation

[54] LOAD CELL
10 Claims, 3 Drawing Figs.

[52] U.S. Cl............................................ 177/208,
73/141 R
[51] Int. Cl....................................... G01g 5/04,
G01l 13/02
[50] Field of Search........................... 73/141 R;
177/141, 208, 209

[56] References Cited
UNITED STATES PATENTS
1,580,430 4/1926 Gaines.......................... 73/141
1,995,996 3/1935 Moore.......................... 177/208 X
3,425,503 2/1969 Bullivant et al............... 177/208

Primary Examiner—Robert S. Ward, Jr.
Attorney—Rea C. Helm

ABSTRACT: A load cell comprises two pistons reciprocable with respect to each other and to a surrounding cylinder. Conventional rolling seals seal the pistons and cylinder to each other providing two opposed fluid-pressure chambers acting on different piston areas. Mutually engageable seating surfaces on the pistons constitute elements of regulating valves for balancing fluid pressures in the chambers when a load is applied. Then a difference in chamber pressures indicates the weight of the load.

PATENTED JAN 11 1972 3,633,696

INVENTOR.
WILLIAM K. KLEYSTEUBER
By Rea C. Helm
Attorney

INVENTOR.
WILLIAM K. KLEYSTEUBER
By *Rea C. Helm*

Attorney

LOAD CELL

This invention relates to load cells or fluid-pressure force transducers. MOre particularly, it relates to load cells operable by fluid pressure, such as pneumatic or hydraulic pressure wherein the magnitude of a load is measured by the difference in pressure created in two connectable chambers. The load cells may be used with other load-measuring means, for example, conveyor belt scales, beam balances, weighing carriages, spring scales and displacement devices.

A conventional fluid load cell consists of a sealed chamber with a movable piston or diaphragm at one end. When a load is placed on a load platform connected to the piston or diaphragm, the pressure of the fluid is measured with a pressure gauge. The pressure is a differential from atmospheric pressure. Also, when this pressure is multiplied by the area of the piston or diaphragm, it indicates the load imposed. The load platform displaced as a function of the compressibility of the fluid and its flow into the pressure gauge. A load placed on the load platform will overshoot the static position because of the mass action of the load. The load platform will then oscillate in an inertial hunting motion because of the mass inertia until the resistance of the system overcomes or dampens this motion. A load cell may have one or more interconnected chambers, diaphragms and regulating values. Among the disadvantages of such load cells are the high initial and maintenance costs of the regulating valves, the effect thereon of outside operating conditions and their inertial hunting motions.

In accordance with my invention, a load is balanced between two fluid pressures acting on two opposing areas having different dimensions, whereby a difference in said pressures is measured and indicates the weight of a load. I provide two pistons reciprocable with respect to each other and with respect to a surrounding cylinder. Conventional rolling seals seal said pistons and cylinder to each other and thereby provide two chambers that house said opposing fluid pressures. Mutually engageable seating surfaces on said pistons constitute elements of regulating valves for balancing said fluid pressures, and for adjusting the height of a load platform that receives the load to be measured and permits the platform always to reach equilibrium at this height. Inertial hunting motion of the load platform will be resisted by counter action from the pressure in the affected chamber.

It is therefore an object of my invention to provide a load cell that indicates the weight of a load by a differential pressure between fluid-pressure chambers.

Another object is to provide a load cell that is not affected by conditions outside the cell.

A further object is to provide a load cell having simple, rugged, maintenance-free valves to balance fluid pressures.

Still another object is to provide a load cell having a load-sensing platform that reciprocates a minimum distance and reaches equilibrium at a set height.

A still further object is to provide a load cell having a load-sensing platform the height of which is adjustable.

Another object is to provide a load cell that is not affected by variation in fluid pressure supply.

These and other objects will become more apparent after referring to the following specification and drawings in which.

Figure 1:
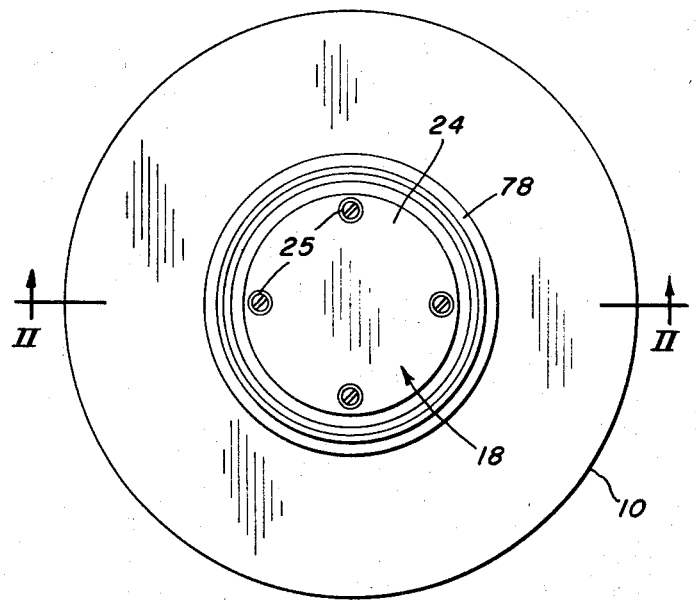
FIG. 1 is a plan view of a load cell made in accordance with this invention.
Figure 2:
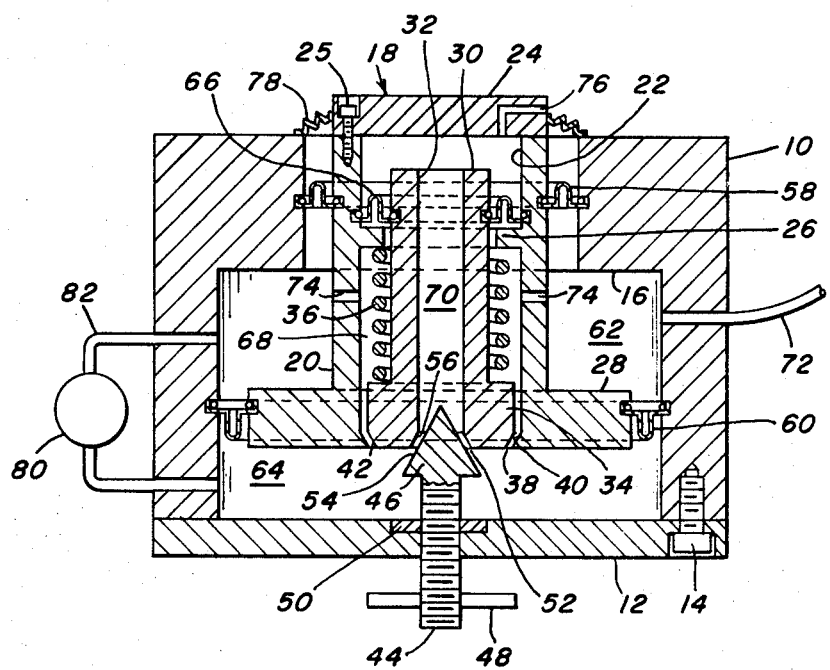
FIG. 2 is a vertical section taken on line II—II of FIG. 1.

Referring now to FIGS. 1 and 2 of the drawings, the load cell comprises body member, here shown as a cylinder, 10, closed at the bottom by a plate 12, attached thereto by screws 14. Cylinder 10 is open at the top, preferably terminating in an internal flange 16. A piston 18, reciprocable in cylinder 10, comprises a cylinder 20 which has an axial bore 22 extending upwardly from the bottom thereof and terminating in a top plate or load-sensing platform 24 to which a load to be measured is applied. Platform 24 is attached to cylinder 20 by screws 25. Adjacent the top of bore 22, cylinder 20 preferably has an internal flange 26. Cylinder 20 preferably has an external flange 28 at the bottom thereof. A second piston 30, reciprocable in bore 22, has an axial bore 32 therethrough and preferably an external flange 34 adjacent the bottom thereof. A compression spring 36, mounted between flanges 26 and 34, urges piston 18 outwardly of and into engagement with piston 30, thereby forming a normally closed inlet valve 38 between a frustoconical seating surface 40 adjacent the bottom of bore 22 and a frustoconical seating surface 42 adjacent the bottom of flange 34. A threaded pin 44 having a conical head 46 is vertically mounted in plate 12 and adjustable therein by turning a lever 48. A seal 50 prevents fluid leakage outwardly. Pin 44 and head 46 normally support pistons 18 and 30 and form a normally closed outlet valve 52, upstanding on the bottom of cylinder 10. Valve 52 is formed by a conical seating surface 54 on head 46 and a frustoconical seating surface 56, adjacent the bottom of bore 32. By means of threaded pin 44 conical head 46 may be reciprocated. Any movement of pin 44 will produce a like movement in the load-sensing platform 24 and its position when in equilibrium. This construction serves to eliminate the inertial hunting motion normally found in load-sensing devices. This construction is particularly applicable, for example, in conveyor belt scales where misalignment of a load-sensing roll in contact with the conveyor belting causes inaccuracies in weighing.

A sealing means 58, which may be any one of the commercially available rolling seals, is sealed to piston 18 preferably, adjacent the top thereof and to cylinder 10, preferably to internal flange 16 on cylinder 10. Another sealing means 60 is sealed to cylinder 10 preferably adjacent the bottom thereof and to piston 18, preferably to flange 28 on piston 18. Some applicable commercially available rolling seals are described in "Machine Design" June 11, 1964, on pages 68 and 69. Seals 58, 60, cylinder 10 and piston 18 define a first space 62. Seal 60, cylinder 10, bottom plate 12 thereof and the bottom surfaces of pistons 18 and 30 define a first chamber 64. Still another sealing means 66 is sealed respectively to pistons 18 and 30, preferably adjacent the upper portions thereof.

Seal 66, valve 38, pistons 18 and 30, define a second space 68. Valve 52, seal 66, pistons 18 and 30 define an exhaust chamber 70. Rolling seals 58, 60 and 66 permit relative motion upwardly and downwardly between the described elements of a load cell to which the extremities of the respective rolling seals are attached.

Fluid under pressure from a source, not shown, is flowed serially through the load cell. A conduit 72, passing radially through the wall of cylinder 10 connects the fluid source and the first space 62. One or more radial conduits 74 in the wall of piston 18 connect spaces 62 and 68 to define a second chamber. Inlet valve 38 connects the first and second chambers. Outlet valve 52 connects the first and exhaust chambers. An exhaust port 76 in top plate 24 of piston 18 connects chamber 70 to the atmosphere. A commercially available protective dust seal 78 may be sealed to cylinder 10 and to piston 18 adjacent the respective upper portions thereof.

Figure 3:
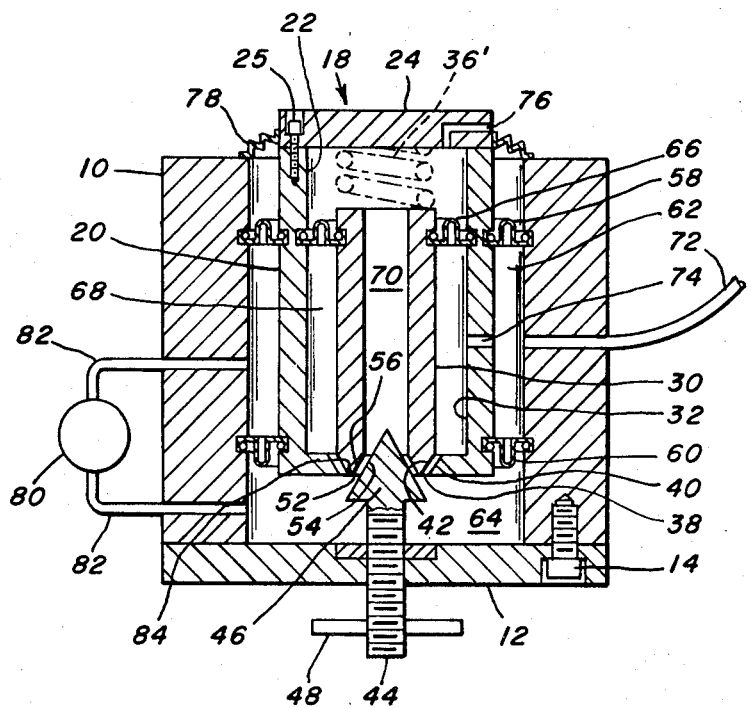
FIG. 3 is a view similar to FIG. 2, showing further embodiments of my invention.

Referring to FIG. 3 of the drawings there are shown other embodiments of the invention. Elements in FIG. 3, common to FIGS. 1 and 2, are numbered the same as in FIGS. 1 and 2. While the preferred form of my invention is illustrated in FIGS. 1 and 2 it is also possible to construct my load cell by mounting a spring 36' as shown in FIG. 3 between the bottom of plate 24 of piston 18 and the top of piston 30. In this construction there may be eliminated from FIGS. 1 and 2, internal flange 26 of piston 18, external flange 34 of piston 30 and spring 36 mounted between these flanges. It is preferred to use either spring 36 or 36' as a more positive means of maintaining closed, valves 38 and 52, for example, in those instances where pressure variations may occur at the fluid pressure source or at some pressure regulator that may be inserted between said source and the second chamber. However, where pressure variations are more closely controlled, spring 36' in FIG. 3 may be eliminated, and for this reason it is shown in dotted lines.

While the use of external flange 28 is preferred, since it permits weighing loads having relatively greater variations in weight, with a particular load cell, it is possible to eliminate external flange 28. In this form of construction rolling seal 60 is connected between cylinder 20 of piston 18 and cylinder 10. This construction also permits elimination of internal flange 16 of cylinder 10. Hence, rolling seal 58 is also connected between cylinder 20 of piston 18 and cylinder 10. Fluid pressure in the first space 62 is transmitted over the area of seals 58 and 60. In the first chamber 64 the fluid pressure is mainly transmitted over the area comprising the opposite area of seal 60 and the bottom of cylinder 20 of piston 18. This area is greater than the area of rolling seal 60, hence, there will still be a pressure differential between the first and second chambers which may be read on meter 80 as a load is placed on plate 24 of piston 18. In this form of construction with external flange 34 of piston 30 eliminated, the bottom surface of piston 30 will be substantially completely eliminated as an area on which the fluid pressure in the first chamber 64 is exerted. As shown in FIG. 3, frustoconical seating surfaces 42 and 56 now define the bottom of piston 30. These surfaces would then come to a point 84.

In use, more particularly with reference to FIGS. 1 and 2, air or other fluid under pressure is admitted into the first space 62 from a source through conduit 72 and then into the second space 68 through conduits 74. Unbalance occurs, due to the pressure in the first chamber, more particularly on the area of the top surface of flange 28, forcing piston 18 downwardly and thereby opening inlet valve 38. This opening permits fluid to enter the second chamber 64 and to force piston 18 upwardly until inlet valve 38 is again closed. Both valves 38 and 52 are assisted in maintaining a closed position by pressure spring 36. Piston 18 is raised, since the fluid pressure in the first chamber 64 is seen to act upon a larger surface than does the fluid pressure in the second chamber, namely, the bottom surface of flange 28 as opposed to the top surface thereof. Equilibrium or balance is quickly established between the forces or pressures in the first and second chambers with a pressure differential between them. This pressure differential is indicated on a meter 80, connected to the first and second chambers by a conduit 82. Preferably, the meter reads weight directly and would indicate substantially the tare weight of piston 18, after, which the meter would be adjusted to read zero weight.

The load cell is now in pressure balance, ready to weigh a load, placed on a load-sensing platform comprising plate 24 of piston 18. When the load is applied, piston 18 is forced downwardly momentarily thereby opening inlet valve 38 and permitting more fluid to flow serially from the source through the second chamber to the first chamber, until the fluid pressure in the latter is sufficient to force piston 18 upwardly and to close valve 38. Valve 38 closes gradually so that the fluid flow is also gradually stopped thus preventing reciprocating motion of piston 18. Meter 80 now indicates the weight of the applied load. Since meter 80 indicates a pressure differential only, any pressure variations of the fluid in inlet 72 will not effect the reading of meter 80 so long as there is sufficient pressure to overcome the downward force on piston 18. In addition, any change in exterior pressures, such as atmospheric pressure, would only effect the tare indication and would not otherwise effect the operation of the load cell.

When the load is removed, unbalance occurs and the fluid pressure in the first chamber raises pistons 18 and 30, momentarily, thereby opening outlet or exhaust valve 52. This permits fluid to flow serially from the first chamber through exhaust chamber 70 and port 76 to the atmosphere, until equilibrium is established and pistons 18 and 30 move downwardly until exhaust valve 52 is closed. The load cell is now ready to weigh a new load.

In use, more particularly with reference to FIG. 3, the operation is substantially the same as described above with reference to FIGS. 1 and 2. In bringing the load cell into balance, the fluid pressure in the first space 62 acts on the area of rolling seal 60, forcing piston 18 downwardly and thus opening inlet valve 38. This allows fluid to flow from the second chamber into the first chamber 64, until the pressure on the bottom surface of rolling seal 60 and piston 18 forces it upwardly and inlet valve 38 is closed. Where spring 36' is used, it assists valves 38 and 52 in remaining closed. The load cell is now in pressure balance and ready to weigh a load. Where spring 36' is not present in the structure, the load cell is now in pressure balance with valves 38 and 52 closed. However, without the help of a spring, valves 38 and 52 are more sensitive to changes in the fluid pressure, for example, in the fluid source as evidenced by fluid pressure changes in the second chamber. An increase in pressure in the latter will momentarily open inlet valve 38 until fluid pressure balance is restored. A decrease in pressure in the second chamber will momentarily cause exhaust valve 52 to open to exhaust sufficient fluid from the first chamber 64 until pressure balance is restored. Bearing the above in mind, weighing of a load can now take place as explained with reference to FIGS. 1 and 2.

While the apparatus of my invention has been described as a load cell for weight measurement used in a vertical position, the cell may be used in any position to measure a force acting axially on piston 18.

Although I have disclosed herein the preferred practice of my invention, I intended to cover as well any change or modification therein which may be made without departing from the spirit and scope of the invention.

I claim:

1. A load cell comprising a body member having an axial opening therethrough open at the top, and a bottom closure member for said opening; a first elongated piston reciprocal inside said body member with a first space between the outer wall of said piston and said axial opening, said piston having an axial opening therein, a pressure receiving bottom surface spaced from said bottom closure member, and a load receiving top surface; a second elongated piston reciprocal inside said first piston with a second space between the outer wall of said second piston and said axial opening of said first piston, said second piston having an axial opening therethrough; first sealing means for closing the lower end of said first space to provide a first chamber between said first sealing means and said bottom closure member; second sealing means for closing the top ends of said first and second spaces; a port through the wall of said first piston between said first and second sealing means for connecting said first and second spaces to provide a second chamber between said first and second sealing means, said second chamber having a bottom area smaller than the top area of said first chamber; an inlet port to said second chamber for admitting fluid under pressure into said first chamber; inlet valve means responsive to downward movement of the first piston when a load is placed on said load-receiving surface for admitting pressurized fluid from said second chamber into said first chamber until the downward force on said bottom area equals the upward force on said top area; exhaust valve mans responsive to the upward movement of the first piston when a load is removed from said load-receiving surface for exhausting said fluid from said first chamber; and means for measuring the difference in fluid pressure between said first and second chambers when a load is placed on said load-receiving surface.

2. A load cell according to claim 1 in which said exhaust valve means includes a base down conical inner portion mounted on the bottom of said body member and a first frustoconical outer surface in the interior of the lower end of said second piston adapted to engage said conical inner portion.

3. A load cell according to claim 2 in which said conical section is threadedly mounted for vertical movement to adjust the height of said first piston when at rest.

4. A load cell according to claim 1 in which said inlet valve means includes a first frustoconical base up outer surface in the interior of the lower end of said first piston and a second frustoconical inner surface on the exterior of the lower portion of said second piston adapted to engage said first frustoconical surface.

5. A load cell according to claim 1 in which said first sealing means includes a first rolling seal between the upper end of said body member and the outside of the upper end of said first piston and a second rolling seal between the inside of the upper end of said first piston and the outside of the upper end of said second piston, and said second sealing means includes a third rolling seal between the lower end of said body member and the lower end of the outside of said first piston.

6. A load cell according to claim 5 in which said body member has an internal flange at the top thereof with said first rolling seal between said internal flange and said first piston and said first piston has an external flange at the bottom thereof with said third rolling seal between said external flange and said body member.

7. A load cell according to claim 1 which includes a compression spring mounted on one end to said first piston and on the other end to said second piston to urge said inlet valve means closed.

8. A load cell according to claim 7 includes an internal flange at the upper end of said first piston inside said second chamber and said spring is mounted between said internal flange and an external flange at the lower end of said second piston with the upper face of said external flange is said second chamber.

9. A load cell according to claim 7 in which said load receiving surface includes a load-sensing platform mounted on top of said first piston.

10. A load cell according to claim 9 in which said compression spring is mounted between said platform and the top of said second piston.

* * * * *